United States Patent
Bryan et al.

(10) Patent No.: US 11,077,960 B2
(45) Date of Patent: Aug. 3, 2021

(54) SATELLITE LAUNCH SYSTEM

(71) Applicants: Harlan Donald Bryan, Auburn, WA (US); Christopher Michael Carey, Issaquah, WA (US)

(72) Inventors: Harlan Donald Bryan, Auburn, WA (US); Christopher Michael Carey, Issaquah, WA (US)

( * ) Notice: Subject to any disclaimer, the term of this patent is extended or adjusted under 35 U.S.C. 154(b) by 254 days.

(21) Appl. No.: 16/046,153

(22) Filed: Jul. 26, 2018

(65) Prior Publication Data

US 2018/0346152 A1    Dec. 6, 2018

Related U.S. Application Data

(63) Continuation of application No. 14/934,148, filed on Nov. 6, 2015, now abandoned.

(60) Provisional application No. 62/082,450, filed on Nov. 20, 2014.

(51) Int. Cl.
 *B64G 1/00* (2006.01)
 *B64G 1/14* (2006.01)

(52) U.S. Cl.
 CPC .............. *B64G 1/14* (2013.01); *B64G 1/005* (2013.01)

(58) Field of Classification Search
 CPC ........... B64G 1/005; B64G 1/14; B64G 1/404
 See application file for complete search history.

(56) References Cited

U.S. PATENT DOCUMENTS

| | | | | |
|---|---|---|---|---|
| 6,029,928 A | * | 2/2000 | Kelly | B64C 25/08 244/171.4 |
| 2002/0139901 A1 | * | 10/2002 | Penn | F02K 9/766 244/171.1 |
| 2004/0217231 A1 | * | 11/2004 | D' Auvergne | B64G 1/14 244/63 |
| 2007/0018036 A1 | * | 1/2007 | Stephenson | B64G 1/14 244/36 |
| 2009/0140101 A1 | | 6/2009 | Salkeld | |

* cited by examiner

*Primary Examiner* — Jessica B Wong
(74) *Attorney, Agent, or Firm* — BakerHostetler

(57) ABSTRACT

A system for launching aerospace payloads includes an unmanned modified lifting body spacecraft (100), with a payload compartment in the forward section of the spacecraft. The spacecraft is propelled by hybrid rockets clustered in the aft section of the spacecraft. Reaction control system (RCS) modules control the flight path and its associated avionics hardware and software. This system also includes a carrier aircraft (200) configured to air-launch the spacecraft. The carrier aircraft includes a flight operations control system, which monitors the spacecraft's payload and monitors and controls launch and flight operations of the spacecraft. A ground-based mission control system monitors and controls the spacecraft's payload and monitors and controls the launch and flight operations of the spacecraft.

34 Claims, 6 Drawing Sheets

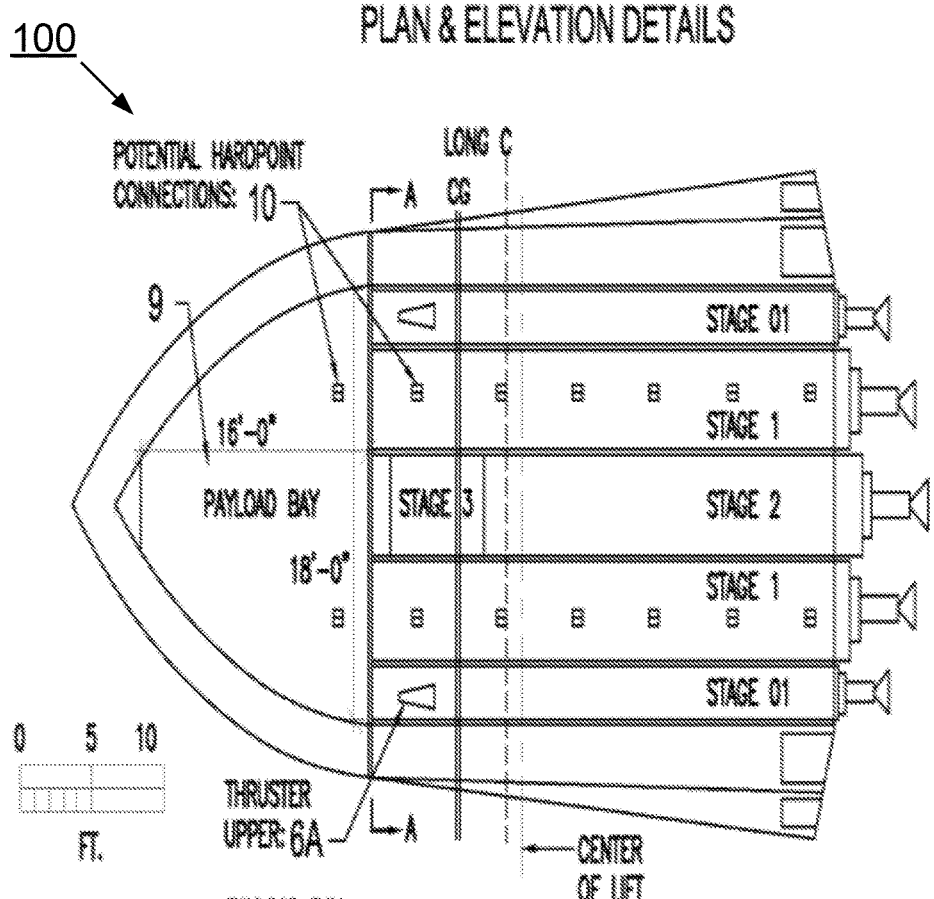
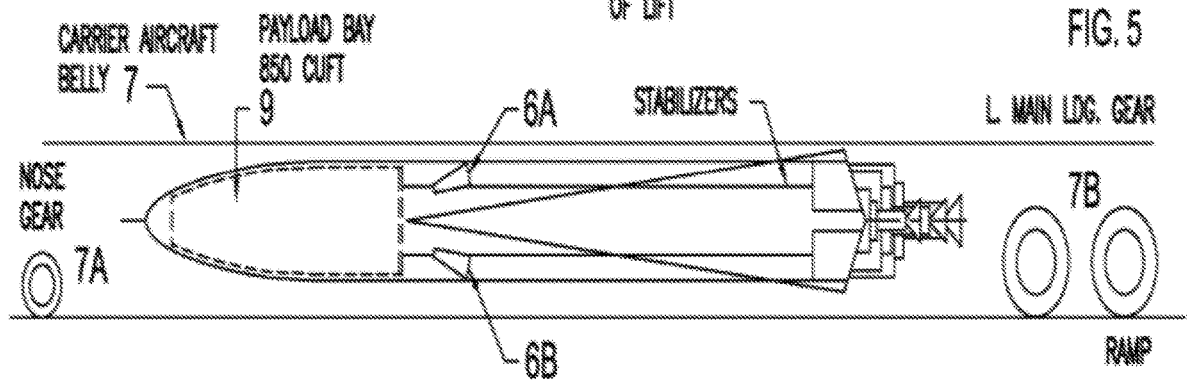
FIG. 4
FIG. 5

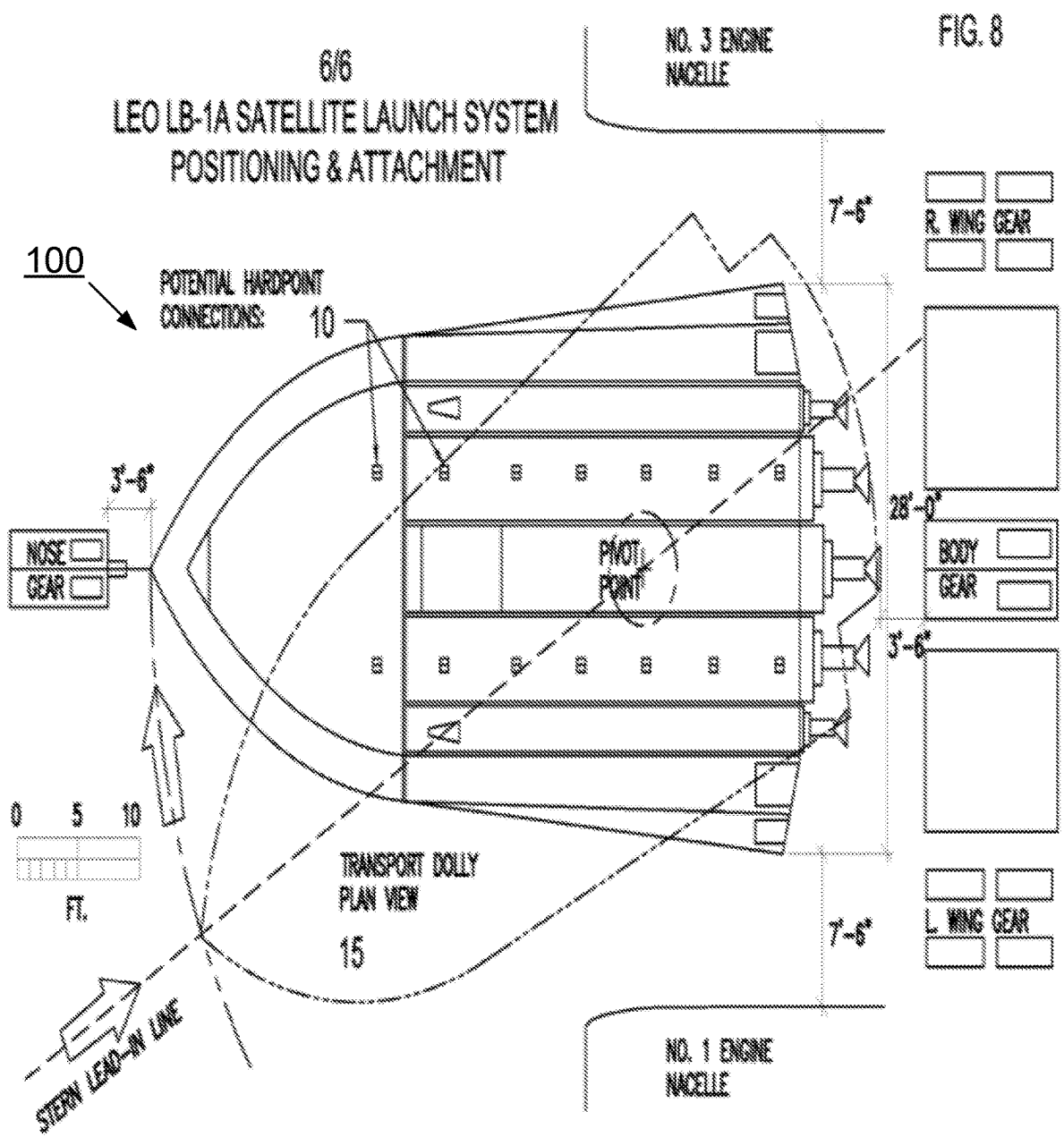

SATELLITE LAUNCH SYSTEM

CROSS REFERENCE TO RELATED APPLICATIONS

This application is a continuation of U.S. patent application Ser. No. 14/934,148, filed Nov. 6, 2015, "LEO LB-1A SATELLITE LAUNCH SYSTEM," which claims priority to Provisional Application No. 62/082,450, filed Nov. 20, 2014. The entire content of these applications is hereby incorporated by reference.

TECHNICAL FIELD

The present disclosure relates generally to satellite launch systems, and more particularly to a system for launching satellites (or "sats") of various sizes, including small-sats, mini-sats, nano-sats, as well as other payloads that may be placed into space.

BACKGROUND

Satellites are essential for many aspects of modern life. GPS, television, broadcast, mobile communications devices, all rely on the ability to place satellites in orbit.

Following advances in engineering and technology, particularly in miniaturization, the lack of an affordable, reliable and easily accessible launch service for small satellites has all but grounded flight-ready experiments and generally stifled progress in the field for several years. Having commissioned a study in summer, 2014, "Air Launch or Ground Launch: A Small Satellite Comparative Study", to discover the reasons for this lapse, the inventors have undertaken to outline a specific air launch response. The concept of air launching space vehicles is well known through the NASA/Dryden B-52 at Edwards AFB in California, and the American space initiative largely owes its evolution to the X-I5 and the Space Shuttle, both developed with data from air launched operations.

While avoiding many vagaries (uncertain weather, scheduling conflicts, flight irregularities, restrictive and expensive protocols, etc.) associated with ground based operations, the delays, high price tags and insurance costs nevertheless remain problematic. We learned from the study that air launching has challenges of its own; the negative impact on the performance of the "pitch-up" maneuver immediately after horizontal separation is far from trivial. Essentially, on release, the vehicle develops negative vertical delta-V. However, the burn rate of rocket fuels is very rapid, generally around one minute or a few seconds longer, therefore considerable first stage energy is depleted in regaining lost altitude and establishing a positive climb profile. Additionally, while rocket aerodynamics are very low drag, they are also very low lift.

SUMMARY

It is the intention of the inventors to utilize the information from the previously commissioned study to design and develop a system including a spacecraft and a carrier aircraft to air launch said spacecraft specifically to enable the affordable and reliable launch of small satellites and other light aerospace payloads as a service to the small-sat industry.

The present invention provides a system for launching satellites, including small-sats, mini-sats, nano-sats, medical and scientific experiments, suborbital, orbital and other aerospace payloads, which includes a modified and optimized existing carrier aircraft, a streamlined, unmanned, rocket-propelled lifting body spacecraft, air launched from said carrier aircraft and containing in addition to its own propulsion, the payload, staging, and insertion rocketry necessary to the mission and provisions for protecting such payload while loading, fueling, transit to and mating with the carrier aircraft, towing, taxiing, conventional takeoff from the ground, climb and cruise to the selected launch point (LP) and high altitude orbital injection, as well as tracking, navigation and control hardware, software and other equipment necessary to establish a safe, reliable and affordable small-sat delivery service.

The inventive system for launching aerospace payloads comprises a wingless, unmanned modified lifting body spacecraft including a payload compartment in a forward section of the spacecraft, hybrid rockets clustered in an aft section of the spacecraft, reaction control system (RCS) modules configured to control a flight path of the spacecraft, and associated avionics hardware and software; and a carrier aircraft configured to air-launch the spacecraft.

An illustrative embodiment further comprises a flight operations control system, carried in the carrier aircraft, configured to monitor the spacecraft's payload and to monitor and control launch and flight operations of the spacecraft. The illustrative embodiment may also include a ground-based mission control system.

In the illustrative embodiment, the hybrid rockets are contained within a shell composed of composite panels forming the aerodynamic shell of the lifting body. Moreover, the composite panels separately encase a portion of the spacecraft housing the hybrid boosters and cover the payload compartment. In the illustrative embodiment, the composite panels join at a horizontal chine line, and are configured to be jettisoned with pyrotechnical charges that separate one or more panels from the remaining structure of the spacecraft.

The illustrative embodiment further comprises control hardware and associated software configured to activate the pyrotechnical charges for the appropriate panels at the appropriate phase of the flight profile, such that panels that encase the hybrid boosters are released together and panels that encase the payload bay are released together.

The illustrative embodiment further comprises chines that widen aft forming wye-shaped stabilizers, wherein each arm of the wye is canted outboard from the vertical. A horizontal arm of the wye is fitted with elevons and/or speed breaks.

In the illustrative embodiment, the hybrid rockets comprise two Stage 01 boosters, two Stage 1 boosters, and one Stage 2 booster. The two Stage 01 boosters are smaller than the Stage 1 and Stage 2 boosters, and the Stage 01 boosters are positioned outboard of their adjacent Stage 1 booster, vertically centered on a horizontal plane of the spacecraft. Moreover, the Stage 01 boosters are mated to the remainder of the spacecraft so as to transfer their thrust to the entire spacecraft, and are configured to be jettisoned with pyrotechnical charges. Further, the Stage 01 boosters are ignited first after the spacecraft separates from the carrier aircraft, and are configured to orient the spacecraft for an initial boost phase of the flight profile. In the illustrative embodiment, the Stage 1 boosters are positioned on either side of the Stage 2 booster, inboard of their respective Stage 01 booster, vertically centered on a horizontal plane of the spacecraft. In this embodiment, the Stage 1 boosters are mated to the spacecraft so as to transfer their thrust to the entire spacecraft, both before and after jettisoning the Stage 01 boosters, and are configured to be jettisoned with pyrotechnical charges.

The Stage 1 boosters are ignited after the spacecraft separates from the carrier aircraft and after the ignition of the Stage 01 boosters, when the spacecraft is in the correct orientation to begin the initial boost phase of the flight profile. Moreover, the Stage 2 booster is centrally positioned on horizontal and vertical planes of the spacecraft, and the Stage 2 booster is mated to the spacecraft so as to transfer its thrust to the entire spacecraft, both before and after jettisoning the Stage 1 boosters, and is configured to be jettisoned with pyrotechnical charges.

In the illustrative embodiment, each hybrid rocket comprises a pressurized oxidizer tank, the reaction chamber with solid fuel, and igniter, combustion channels, exhaust nozzle, valves to control oxidizer flow, and hardware and associated software to monitor and control the operation of the booster. In this embodiment, each hybrid rocket further comprises an oxidizer tank pressurized so as to control the flow of the oxidizer into the reaction chamber in order to modulate thrust by starting and controlling the rate of combustion; hardware and associated software that monitors and controls sensors and actuators that manage the oxidizer flow as well as proper temperature and pressure of the oxidizer within the tank. In addition, each hybrid rocket further comprises: a reaction chamber configured to contain fuel for the rocket, the igniter, and combustion channel where the fuel and oxidizer combine and are ignited to generate propulsive force; and ablative materials used to maintain correct operational temperatures within the combustion chamber. Moreover, each hybrid rocket further comprises: an exhaust system assembly including an interface to the reaction chamber, throat, nozzle, sensors, actuators, hardware and associated software to monitor and control exhaust flow.

In the illustrative embodiment, each hybrid rocket further comprises pyrotechnical charges that detach the rocket from structural members of the spacecraft to which the hybrid rocket is mated, and hardware and associated software that interface with the flight system avionics, to trigger the charges at the appropriate stage of the flight profile. In this embodiment, each hybrid rocket further comprises: a casing with associated structural members and interfaces that aggregate the subcomponents of the rocket into a single component, wherein the casing, via its associated structural members and interfaces, is connected with other components as required by the final spacecraft assembly.

In the illustrative embodiment, the RCS comprises four individual modules, located symmetrically about horizontal and vertical planes of the spacecraft, forward of the center of gravity, forward of the respective Stage 01 boosters, mounting to the aft face of the payload compartment bulkhead. In this embodiment, each RCS module comprises a pressured tank of monopropellant (e.g. concentrated hydrogen peroxide), reaction chambers containing a catalyst (e.g. Tungsten mesh), and multiple exhaust ports, oriented to provide pitch, roll, yaw, and translation control of the spacecraft. Moreover, each RCS module further comprises hardware and associated software configured to monitor and control sensors and actuators that manage the oxidizer flow and proper temperature and pressure of the oxidizer within the tank.

The illustrative embodiment further comprises a cowling and shielding around the exhaust ports to interface with and protect the panels comprising an aerodynamic shell to allow the thrusters to operate while the sheathing is in place. This embodiment also comprises a propulsion module made up of an assemblage of the rockets, structural members, and avionics.

In the illustrative embodiment, the payload compartment comprises a payload compartment bulkhead; structural members to support composite panels enclosing the payload bay until they are jettisoned; apparatus configured to secure and deploy payload components; a system of sensors, actuators, hardware and associated software configured to monitor the state of the payload bay, the payload, and to control jettisoning of the composite panels at an appropriate stage of the flight profile.

In the illustrative embodiment, the payload compartment bulkhead is configured as a means by which the propulsion module transfers motive force to the payload; as a means by which the apparatus that secures and deploys the payload components is secured to the spacecraft and interfaced to the spacecraft avionics; and as a platform from which the payload components, upon achieving orbit, are placed into the initial phase of their orbital insertion profile.

In the illustrative embodiment, the monitoring and control of the spacecraft, including the payload, is managed by hardware and associated software comprising a top-level avionics infrastructure for the entire spacecraft, the infrastructure interfacing with control systems of all spacecraft sub-components.

In the illustrative embodiment, the infrastructure accepts operational directives for the spacecraft and coordinates the activity of systems to realize and apply the directive, and compiles and presents all operational status for all spacecraft systems.

In the illustrative embodiment, the carrier aircraft comprises the airframe itself, configured to conduct an air launch of the spacecraft; a physical interface that mates the spacecraft to the carrier aircraft; engines that provide propulsion for the carrier aircraft; and apparatus to configure a portion of the space inside the fuselage to house a flight operations control system.

The illustrative embodiment further comprises a physical interface that mates the spacecraft to the carrier aircraft, supports the spacecraft during takeoff and flight to the launch point, and deploys the spacecraft at launch. In this embodiment, the physical interface attaches to the carrier aircraft by a set of hard points bound to load-bearing structural members of the carrier aircraft, the hard points being positioned to enforce stability during takeoff and flight. The physical interface also includes a decoupling apparatus where the spacecraft connects with the interface such that, at the time of launch, the interface releases the connection with all hard points on the spacecraft simultaneously.

In the illustrative embodiment, the flight operations control system comprises avionics hardware and associated software configured to monitor the payload, and to monitor and control the spacecraft from the time it is mated to the carrier aircraft until control is transferred to the ground-based mission control system; communications apparatus; and power supply and conditioning apparatus.

In the illustrative embodiment, the ground-based mission control system comprises hardware and associated software configured to monitor and control the payload, to monitor and control the spacecraft over its operational lifetime; communications apparatus; and power supply and conditioning apparatus.

An additional important feature includes a low, wheeled, concave dolly designed to facilitate servicing and loading of the spacecraft to the carrier aircraft. Further, an illustrative best embodiment of the invention includes a provision for truncating standard rocket nose cones at the payload bulkhead in favor of utilizing the said space craft's much larger magnum payload bay (MPB). A further illustrative embodiment involves configuring the spacecraft as a flying test bed for new spacecraft prototypes. Moreover, illustrative embodiments may include an operations specifications and limitations storage medium (e.g., a computer readable medium) describing in detail the manner of operating the launch system, together with checklists for each phase, including standard, irregular, and emergency procedures. Other aspects of the present invention are described below and depicted in the drawings.

BRIEF DESCRIPTION OF THE DRAWINGS

FIG. 4 is a detail plan view of the LB-1 spacecraft of the present invention.

FIG. 5 is a detail elevation view of the LB-1 spacecraft of the present invention.

FIG. 8 is a plan view of positioning and attachment of said LB-1 spacecraft of the present invention.

DETAILED DESCRIPTION OF ILLUSTRATIVE EMBODIMENTS

All illustrations of the drawings are for the purpose of describing illustrative embodiments and are not intended to limit the scope of the present invention.

Figure 1:
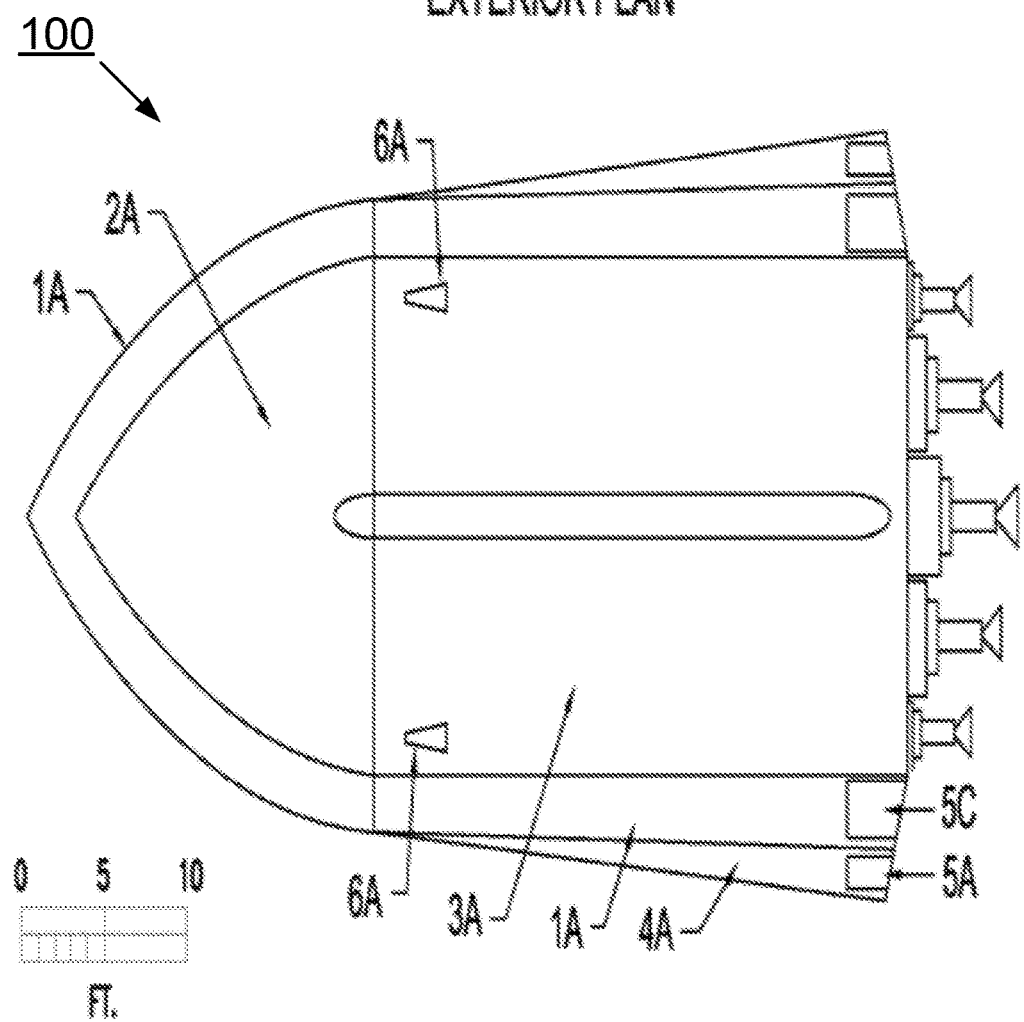
FIG. 1 is an exterior plan view of the LB-1 spacecraft (100) of the present invention.
Figure 2:
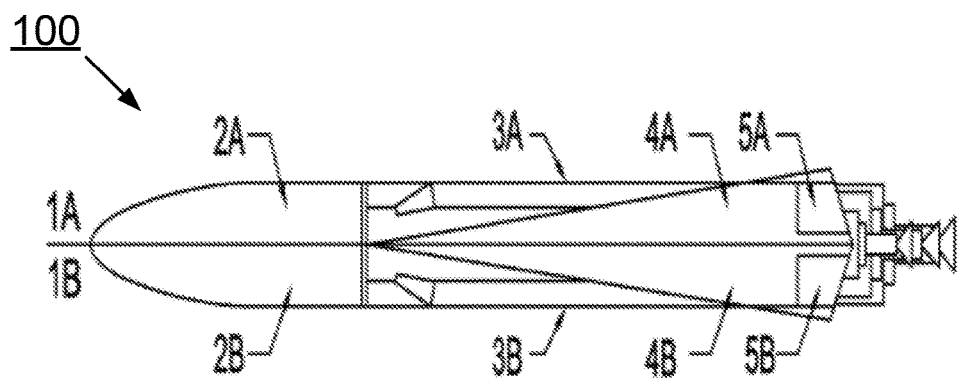
FIG. 2 is an exterior elevation view of the LB-1 spacecraft of the present invention.
Figure 3:
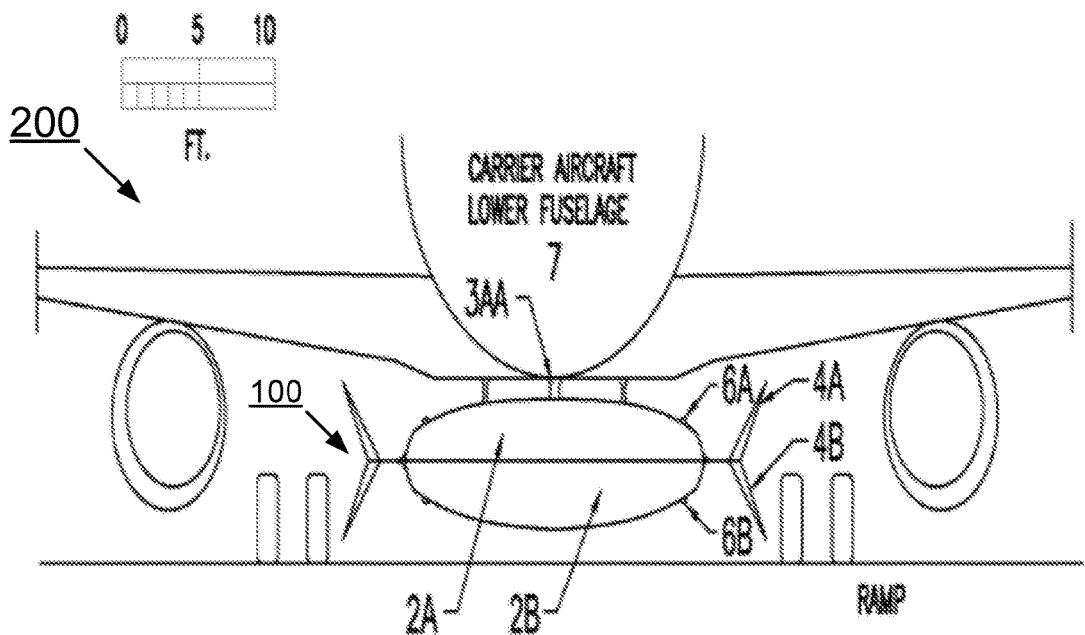
FIG. 3 is a front exterior view of the LB-1 spacecraft and the carrier aircraft (200).

The present invention provides a system for launching satellites, including small-sats, mini-sats, nano-sats, medical and scientific experiments, suborbital, orbital and other aerospace payloads, including a modified and optimized existing carrier aircraft, a streamlined, unmanned rocket-propelled lifting body spacecraft (100), air launched from said carrier aircraft (200) and containing in addition to its own propulsion, the payload, staging, propulsion and insertion rocketry necessary to the mission and the provisions for protecting said payload during loading, fueling, transit to and mating with said carrier aircraft, towing, taxiing, conventional takeoff from the runway, climb and cruise to the selected launch point (LP) and high altitude release, as well as the tracking, navigation and control hardware, software and other equipment to effect a safe, reliable and affordable delivery service, including:

FIGS. 1, 2, 3 depict exterior views of LB-1, an unmanned, rocket-powered, wingless lifting body spacecraft 100, assembled of commercially available composite rocket boosters, complete with solid or hybrid fueled motors and strapping hardware. The spacecraft's lifting body characteristics are designed to mitigate lift and altitude losses at the horizontal release maneuver (HRM) and its wingless profile allows attachment between the engines and landing gear of the carrier aircraft 200 (as shown in FIG. 3, at the lower fuselage 7). Joined at chine lines 1A & B, streamlined airfoils of carbon/composite form the nose cone, 2A & 2B, and main body fairings 3A & 3B to create a strong, lightweight covering and provide a lift factor of approximately 65 pounds per square foot. Reference number 3AA (FIG. 3) illustrates an attachment fairing. Mid-body horizontal chines 1A & 1B on each side gradually widen aft of the nose cone from 2 to 3 feet, terminating in upper and lower "wye" stabilizers 4A & 4B canted outboard 60 degrees from the horizontal and fitted with split elevons 5A & 5B to maintain roll control in the atmosphere. Additionally, the aft chines are fitted with split horizontal elevons for pitch control and use as speed brakes.

The spacecraft's body cross section may be described as a flattened ellipse with a longitudinally placed, laterally centered conventional 2/3-stage rocket booster flanked by symmetrical pairs of propellant boosters of decreasing diameters and a wide, tapering nose cone to establish the desired cross-sectional airfoil.

Four thrusters 6A & 6B (FIGS. 3 and 5) have been provided near the forward end of the upper and lower outboard boosters to increase stability during pitch-up. To avoid waste of Stage 1 thrust, small outboard boosters designated "Stage 01" will be ignited to accomplish the pitch-up maneuver prior to Stage 1 ignition. (See FIGS. 4 and 7.) It is foreseen that this combination along with the aforesaid improvement in lift will result in a considerably smoother, more controlled and economical spacecraft rotation.

Figure 6:
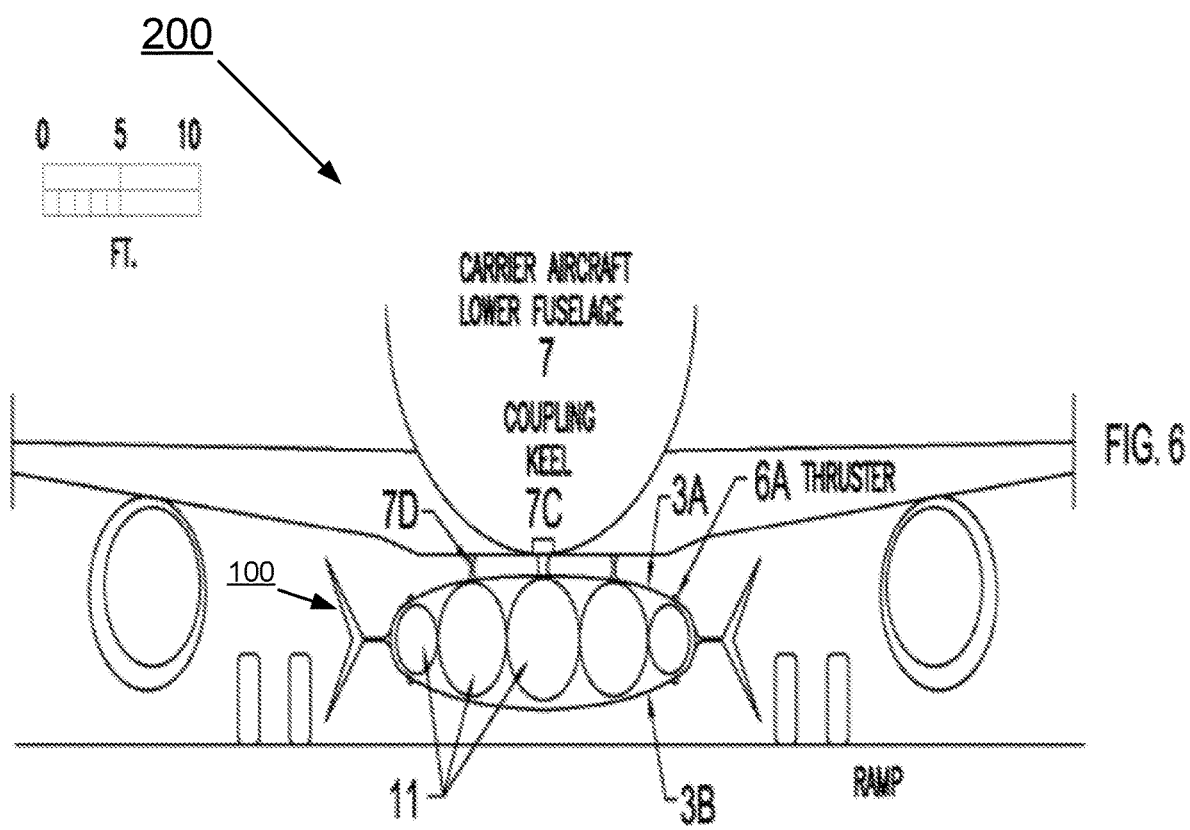
FIG. 6 is a section at line A-A of the LB-1 spacecraft of the present invention.

FIGS. 4, 5, 6: Carrier aircraft belly vertical clearance 7 and landing gear fore and aft clearance 7A & 7B are shown with LB-1 mounted. Reference number 7C indicates the coupling keel and 7D the mounting snubbers. The payload bay is at 9, and potential carrier aircraft hard point connections at 10. (See FIG. 4.) The arrangement of boosters permitting maximum opportunity to accommodate various loading options and combinations of payload types is shown in relation to stages. The preferred embodiment provides that the rocket casings at 11 (FIG. 6) may be truncated at the firewall along section line A-A and the entire nose of the spacecraft or selected portions thereof may be utilized.

Figure 7:
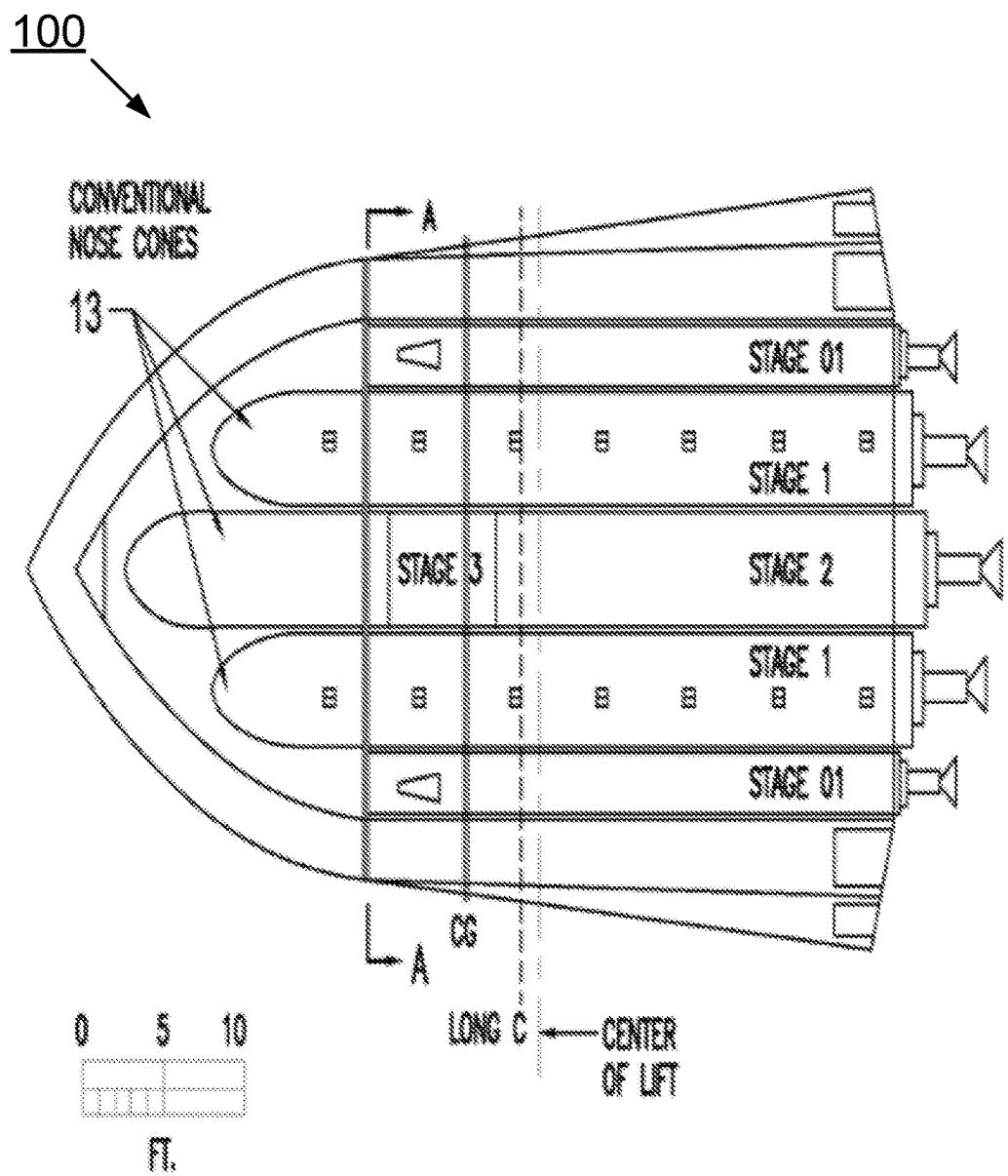
FIG. 7 is a plan view of conventional booster detail of the LB-1 of the present invention.

FIG. 7 depicts a plan view showing a conventional booster display at 13. To enable and control the cost of this "quick-change" facility it is planned that several firewall/payload plate options will be made available at loading sites.

FIG. 8 provides a positioning diagram for mating of the LB-1 utilizing the carrier aircraft hard point connections 10. An outline of the transport dolly chassis 15 demonstrates lead-in guidance and critical component clearances. A low, wheeled concave dolly shaped to accept, center and support the convex lower spacecraft half for precisely placing the propellant boosters and to support the same during transit, servicing, fueling, applying the upper spacecraft half and towing under the carrier aircraft for mounting and supplying battery power to said spacecraft components.

Facilities for the monitoring and audible alarm of latching/sealing mechanisms, rising temperatures, leakage of oxidizer, suppression of fire and other safety measures which may be provided at the spacecraft, and the carrier aircraft cockpit and launch control stations, separate from similar systems in the carrier aircraft.

Attachments and adaptors on the carrier aircraft and the spacecraft to enable the quick attachment/release of the spacecraft may also be provided.

Facilities in the carrier aircraft and on the ground to remotely control the spacecraft as a mission-abort/reentry vehicle may also be provided.

Computerized Operations Specifications and irregular and emergency procedures and checklists to be performed by crew members will govern in all phases of the mission.

The LB-1 spacecraft is scalable over the range of potential carrier aircraft to suit the requirements of smaller or larger payloads.

The LB-1 is designed for polar and equatorial launch missions.

Although the invention has been described in terms of its preferred embodiment, it is to be understood that many other possible modifications and variations can be made without departing from the spirit and scope of the invention. Launch preparations, including assembling, loading, and attaching the LB-I to the aircraft, include, in the following order:

1. Lower body fairing, chines, stabs.
2. Thrust plate.
3. Firewall
4. Stage 2/3 booster.
5. Stage I boosters & straps.
6. Stage OI boosters & straps.
7. Left & Right Thrusters.
8. Payload plate.
9. Upper Body fairing, chines, stabs.
10. Secure cargo in Payload Bay.
11. Place nose cone, secure & check all fasteners.
12. Align LB-I beneath carrier aircraft.
13. Complete LB-I attachment checklist.
14. Attach LB-I to carrier aircraft & secure.

Flight operations, including towing, taxiing, takeoff, and flight, require the following:

1. All towing operations with LB-I attached shall be conducted in radio contact with qualified ground crew ahead and behind the carrier aircraft and ground level visibility of at least 3 nautical miles.

2. Prior to engine start all landing gear and tires shall be checked for damage or irregularities and the captain advised.

3. Immediately prior to every take-off with LB-1 attached the ground crew shall scan the takeoff runway for foreign objects and remove any debris advising the captain by radio that the runway surface is safe for takeoff.

4. When the captain receives the ground crew "disconnect" salute his acknowledgement will indicate his acceptance of aircraft, spacecraft and runway surface as suitable for the launch mission subject to tower takeoff clearance, and he will change frequency accordingly. The ground crew will remain clear of the taxiway but in the general area until the takeoff is complete.

5. Special procedures will govern LB-1 flight operations, including more restrictive takeoff weather minimums for ceiling, visibility, crosswind, runway clutter and precipitation. Also rejected takeoff, fuel dumping, primary and alternate launch point (LP) criteria, will be more critical, especially tropopause weather, particularly winds, which can be in excess of 200 knots and turbulence which may be extreme. Alternate launch points (LPs)/altitudes will be filed for every mission.

6. Staging will generally be conventional for the launch type being conducted, however all specifications, exceptions, alternate launch points (LPs) and other advisories will be included on the flight plan and updated automatically or upon request.

7. In the event of a failure in a primary launch system or component, a joint decision will be reached between the captain and the launch coordinator as to whether a safe/successful launch can be achieved with a standby system or component or hand-flown maneuver, or whether the load should be returned to base or jettisoned, and if either of the latter, whether carrier aircraft fuel dumping or another safer course of action is indicated.

8. Although air-launch has demonstrated an excellent safety record in both manned and unmanned missions, payload insurance continues a major driver of launch cost, therefore every effort should be extended to design equipment and procedures to the highest standards of safe operation.

We claim:

1. A system for launching aerospace payloads, comprising:
    an unmanned lifting body spacecraft including a payload compartment in a forward section of said spacecraft, rockets clustered in an aft section of said spacecraft, reaction control system (RCS) modules configured to control a flight path of said spacecraft, and associated avionics hardware and software;
    chines comprising wye-shaped stabilizers, wherein each arm of the wye is canted outboard from the vertical, and wherein a horizontal arm of the wye is fitted with elevons; and
    a carrier aircraft configured to air-launch said spacecraft.

2. The system of claim 1, further comprising a low, wheeled, concave dolly configured to facilitate servicing and loading of said spacecraft to said carrier aircraft.

3. The system of claim 1, further comprising a ground-based mission control system.

4. The system of claim 1, wherein the rockets are contained within a shell composed of composite panels forming an aerodynamic shell of the lifting body.

5. The system of claim 4, wherein the composite panels join at a horizontal chine line.

6. The system of claim 4, wherein the composite panels are configured to be jettisoned with pyrotechnical charges that separate one or more composite panels from the spacecraft.

7. The system of claim 6, further comprising control hardware and associated software configured to activate the pyrotechnical charges for one or more composite panels at appropriate phases of the flight profile, such that composite panels encasing the rockets are released together and composite panels encasing the payload bay are released together.

8. The system of claim 1, wherein the rockets comprise two Stage 01 boosters, two Stage 1 boosters, and one Stage 2 booster.

9. The system of claim 8, wherein the two Stage 01 boosters are smaller than the Stage 1 and Stage 2 boosters.

10. The system of claim 8, wherein the Stage 01 boosters are positioned outboard of their adjacent Stage 1 booster, vertically centered on a horizontal plane of the spacecraft.

11. The system of claim 8, wherein the Stage 01 boosters are mated to the spacecraft so as to transfer thrust to the spacecraft, and are configured to be jettisoned with pyrotechnical charges.

12. The system of claim 8, wherein the Stage 01 boosters are configured to ignite after the spacecraft separates from the carrier aircraft.

13. The system of claim 8, wherein the Stage 1 boosters are positioned on either side of the Stage 2 booster, inboard of their respective Stage 01 booster, vertically centered on a horizontal plane of the spacecraft.

14. The system of claim 8, wherein the Stage 1 boosters are mated to the spacecraft and are configured to be jettisoned with pyrotechnical charges.

15. The system of claim 14, wherein the Stage 1 boosters are configured to ignite after the spacecraft separates from the carrier aircraft and after ignition of the Stage 01 boosters.

16. The system of claim 8, wherein the Stage 2 booster is centrally positioned on horizontal and vertical planes of the spacecraft.

17. The system of claim 16, wherein the Stage 2 booster is mated to the spacecraft and is configured to be jettisoned with pyrotechnical charges.

18. The system of claim 1, wherein each rocket comprises: a pressurized oxidizer tank, a reaction chamber with solid fuel, an igniter, combustion channels, an exhaust nozzle, valves to control oxidizer flow, and hardware and associated software to monitor and control an operation of the rockets.

19. The system of claim 18, wherein each rocket further comprises an oxidizer tank pressurized to control a flow of the oxidizer into the reaction chamber to modulate thrust by starting and controlling a rate of combustion; and hardware and associated software that monitors and controls sensors and actuators that manage the flow of the oxidizer as well as proper temperature and pressure of the oxidizer within the tank.

20. The system of claim 18, wherein each rocket further comprises: a reaction chamber configured to contain fuel for the rockets, an igniter, and a combustion channel where the fuel and oxidizer combine and are ignited to generate propulsive force; and ablative materials used to maintain correct operational temperatures within the combustion chamber.

21. The system of claim 20, wherein each rocket further comprises: an exhaust system assembly including an interface to the reaction chamber, a throat, a nozzle, sensors, actuators, and hardware and associated software to monitor and control exhaust flow.

22. The system of claim 21, wherein each rocket further comprises: pyrotechnical charges that detach the rockets from structural members of the spacecraft to which the rockets are mated, and hardware and associated software that interface with flight system avionics to trigger charges at during a flight.

23. The system of claim 22, wherein each rocket further comprises: a casing with associated structural members and interfaces that aggregate the subcomponents of the rocket into a single component, wherein the casing, via its associated structural members and interfaces, is connected with other components as required by the final spacecraft assembly.

24. The system of claim 1, wherein each RCS comprises monopropellent comprising concentrated hydrogen peroxide, and the catalyst comprises a Tungsten mesh.

25. The system of claim 1, wherein each RCS module further comprises hardware and associated software configured to monitor and control sensors and actuators that manage an oxidizer flow and proper temperature and pressure of an oxidizer within a tank.

26. The system of claim 1, wherein the payload compartment comprises a payload compartment bulkhead; structural members to support composite panels enclosing the payload compartment; apparatus configured to secure and deploy payload components; a system of sensors, actuators, hardware and associated software configured to monitor a state of the payload compartment, a payload, and to control jettisoning of said composite panels at an appropriate stage of a flight profile.

27. The system of claim 26, wherein the payload compartment bulkhead is configured as a means by which a propulsion module transfers motive force to the payload; as a means by which an apparatus that secures and deploys the payload components is secured to the spacecraft and interfaced to the spacecraft avionics; and as a platform from which payload components, upon achieving orbit, are placed into an initial phase of their orbital insertion profile.

28. The system of claim 1, wherein monitoring and control of the spacecraft, including a payload, is managed by hardware and associated software comprising a top-level avionics infrastructure for the spacecraft, said infrastructure interfacing with control systems of all spacecraft sub-components.

29. The system of claim 28, wherein said infrastructure accepts operational directives for the spacecraft and coordinates activity of systems to realize and apply a directive, and compiles and presents all operational status for all spacecraft systems.

30. The system of claim 1, further comprising a physical interface that mates said spacecraft to said carrier aircraft, supports said spacecraft during takeoff and flight to a launch point, and deploys said spacecraft at launch.

31. The system of claim 30, wherein said physical interface attaches to said carrier aircraft by a set of hard points bound to load-bearing structural members of said carrier aircraft, said hard points being positioned to enforce stability during takeoff and flight.

32. The system of claim 31, wherein said physical interface includes a decoupling apparatus where said spacecraft connects with the interface such that, at the time of launch, the interface releases the connection with all hard points on said spacecraft simultaneously.

33. The system of claim 3, wherein the flight operations control system comprises avionics hardware and associated software configured to monitor the payload, and to monitor and control said spacecraft from the time it is mated to said carrier aircraft until control is transferred to the ground-based mission control system; communications apparatus; and power supply and conditioning apparatus.

34. The system of claim 3, wherein the ground-based mission control system comprises hardware and associated software configured to monitor and control the payload, to monitor and control said spacecraft over its operational lifetime; communications apparatus; and power supply and conditioning apparatus.

* * * * *